US 8,348,307 B2

(12) United States Patent
Moro

(10) Patent No.: US 8,348,307 B2
(45) Date of Patent: Jan. 8, 2013

(54) SEATBELT DEVICE

(75) Inventor: Kazuhiro Moro, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/140,299

(22) PCT Filed: Dec. 3, 2009

(86) PCT No.: PCT/JP2009/070350
§ 371 (c)(1),
(2), (4) Date: Jun. 16, 2011

(87) PCT Pub. No.: WO2010/071033
PCT Pub. Date: Jun. 24, 2010

(65) Prior Publication Data
US 2011/0248489 A1    Oct. 13, 2011

(30) Foreign Application Priority Data

Dec. 16, 2008  (JP) .................. 2008-319858

(51) Int. Cl.
*B60R 22/28* (2006.01)
(52) U.S. Cl. ..................... 280/805; 242/379.1
(58) Field of Classification Search .......... 280/805–807; 242/379.1, 381.1, 382, 383.2, 383.5; 297/471, 297/472, 478
See application file for complete search history.

(56) References Cited

U.S. PATENT DOCUMENTS

| | | | | |
|---|---|---|---|---|
| 3,952,967 A | * | 4/1976 | Barile et al. | ............. 242/379.1 |
| 6,616,081 B1 | * | 9/2003 | Clute et al. | ............. 242/379.1 |
| 7,152,824 B2 | * | 12/2006 | Shiotani et al. | ............. 242/379.1 |
| 7,392,957 B2 | * | 7/2008 | Hiramatsu | ................. 242/379.1 |
| 2004/0206844 A1 | * | 10/2004 | Shiotani et al. | ............. 242/379.1 |

FOREIGN PATENT DOCUMENTS

| | | | |
|---|---|---|---|
| JP | 10-297426 | | 11/1998 |
| JP | 2003-19945 | | 1/2003 |
| JP | 2003019945 A | * | 1/2003 |
| JP | 2004-276742 | | 10/2004 |
| JP | 2007-331563 | | 12/2007 |

OTHER PUBLICATIONS

International Search Report of PCT/JP2009/070359, Mailed Feb. 2, 2010.

* cited by examiner

*Primary Examiner* — Paul N Dickson
*Assistant Examiner* — Robert A Coker
(74) *Attorney, Agent, or Firm* — Brinks Hofer Gilson & Lione

(57) ABSTRACT

A seatbelt device having a first energy absorbing member with two axial direction end portions attached respectively to a spindle and a lock member and which absorbs energy by undergoing twisting deformation when a load of at least a predetermined value acts on the spindle while the lock member is locked during an emergency. A second energy absorbing member is fixed to the spindle at one end portion and extends through a bend route provided in the lock member. The second energy absorbing member absorbs energy by being pulled through the bend route so as to undergo plastic deformation when the spindle rotates as a result of twisting of the first energy absorbing member. A deformation portion is interposed between a turned back portion of the second energy absorbing member and the spindle. With this constitution, unstable load variation can be suppressed in an initial stage of an operation, and as a result, a stable tension can be applied to a webbing such that an occupant can be protected effectively and safely.

10 Claims, 14 Drawing Sheets

(a)

(b)

(a)

(b)

(a)

(b)

(a)

(b)

(a)

(b)

Prior Art

SEATBELT DEVICE

BACKGROUND

1. Field of the Invention

The present invention relates to a seatbelt device, and more particularly to a seatbelt device provided with an energy absorbing member that mitigates a load received by an occupant from a webbing during a vehicle collision.

2. Related Technology

A conventional seatbelt device for holding an occupant of a vehicle or the like in a seat includes an emergency locking mechanism driven by a sensor that reacts to sudden acceleration, a collision, or deceleration so as to physically lock unreeling of a webbing thereby restraining the occupant effectively and safely. The seatbelt device is further provided with an energy absorbing mechanism that performs energy absorption in order to lighten a load on a chest portion of the occupant by allowing the webbing to unreel by a predetermined amount when a collision force generated by the collision is large such that a load exerted on the webbing in response to inertial movement of the occupant reaches or exceeds a preset predetermined value.

In a known conventional seatbelt device (a two-stage control type seatbelt device) for effectively protecting an occupant from an impact force generated during a collision, a restraining force is controlled in two stages by setting an unreeling force of the webbing to be large for a predetermined time period in an initial stage of the collision, during which a comparatively powerful force acts on the occupant, and then reducing the unreeling force. With regard to the energy absorbing mechanism used in this type of seatbelt device, one end portion of a torsion bar disposed coaxially with a spindle for retracting the webbing is attached to the spindle, and the other end portion of the torsion bar is attached to a lock member of the emergency locking mechanism. When a load acting on the spindle in the webbing unreeling direction reaches or exceeds a predetermined value during an operation of the emergency locking mechanism, impact energy is absorbed by causing the torsion bar to twist. Furthermore, impact energy is absorbed during the initial stage of the collision by an additional energy absorbing mechanism that uses bending, twisting, and so on of a wire (see Patent Documents 1 to 4, for example).

As shown in FIG. 14, a seatbelt device 100 described in Patent Document 1 includes a first energy absorbing mechanism that absorbs impact energy by causing a torsion bar 101 disposed coaxially with a spindle 102 to twist during an emergency. In addition to the first energy absorbing mechanism, the seatbelt device 100 includes a second energy absorbing mechanism provided with a strip-form bending element 107 that is fixed at a tip end thereof to a circumferential direction groove 104 formed in the spindle 102, bent back by a radial direction groove 103, and accommodated in a bend route 106 provided in a locking member 105 to be capable of passing through the bend route 106. During an emergency, the second energy absorbing mechanism causes the bending element 107 to rotate together with the spindle 102 such that the bending element 107 passes through the bend path 106. Accordingly, the bending element 107 undergoes partial plastic deformation, and as a result, the impact energy is absorbed.

The restraining force is controlled in two stages by activating the first energy absorbing mechanism and the second energy absorbing mechanism simultaneously in the initial stage of the collision such that a comparatively large load is applied to the webbing and by applying a smaller, more stable load in a later stage of the collision generated by the first energy absorbing mechanism alone. In this seatbelt device, a play C is provided when the bending element 107 is engaged with the spindle 102 for a predetermined time after the second energy absorbing mechanism is activated in order to suppress an increase in webbing tension.

Similarly, seatbelt retractors described in Patent Documents 3 and 4 perform control such that impact energy is absorbed in two stages using a torsion bar serving as a primary load limiting member and a wire serving as a secondary load limiting member.

The above referenced patent documents are identified as Patent Document 1: Japanese Patent Application Publication No. 2003-19945; Patent Document 2: Japanese Patent Application Publication No. 2004-231019; Patent Document 3: Japanese Patent Application Publication No. 2006-27604; and Patent Document 4: Japanese Translation of PCT Application No. 2006-501105.

In this type of seatbelt device, the webbing tension increases rapidly from activation of an emergency locking means to a point at which the spindle starts to rotate, and an extremely large load is generated from the moment at which a gap between related components disappears. When the spindle begins to rotate thereafter, friction from the rotary part changes from static friction to kinetic friction, which has a small frictional coefficient $\mu$. Accordingly, the webbing tension decreases rapidly and then stabilizes at a predetermined load (a load generated by twisting of the torsion bar). Hence, the load applied to the webbing tends to be unstable in the initial stage of an operation.

As shown by a dotted line in FIG. 5, in the seatbelt device 100 described in Patent Document 1, the webbing is unreeled comparatively easily immediately after activation of the emergency locking means using the space or play C in the second energy absorbing mechanism. Further, when static frictional resistance changes to kinetic frictional resistance such that the webbing tension decreases, the space or play C disappears, thereby suppressing a rapid reduction in the webbing tension. As a result, variation in the webbing tension is suppressed, and an occupant restraining performance is stabilized. However, the load generated at the moment when the gap or play disappears between the related components, those constituting the second energy absorbing mechanism, remains large, and therefore the load generated during the initial stage of an operation of the seatbelt device may not always be stabilized sufficiently, which requires further improvement.

SUMMARY

The present invention has been designed in consideration of the problem described above, and an object thereof is to provide a seatbelt device that controls the tension of a webbing in two stages (to be referred to hereafter as a two-stage control type seatbelt device), and is capable of applying stable tension to the webbing by suppressing unstable load variation during an initial stage of an operation so that an occupant can be protected effectively and safely.

The object of the present invention described above is achieved by the following constitutions.

(1) A seatbelt device including:
a spindle attached to a retractor frame to be free to rotate, a webbing being wound around an outer periphery thereof;
a lock member that can rotate relative to the refractor frame and can be locked to the retractor frame during an emergency;

emergency locking means for preventing the spindle from rotating in a webbing unreeling direction during the emergency by engaging the lock member with the refractor frame;

a first energy absorbing member that is attached to the spindle by one axial direction end portion and attached to the lock member by another axial direction end portion, and absorbs an impact energy by undergoing twisting deformation when a load of at least a predetermined value acts on the spindle in the webbing unreeling direction while the lock member is locked by the emergency locking means during the emergency, thereby permitting relative rotation between the spindle and the lock member; and a second energy absorbing member that is formed in a strip form or a wire form, fixed to and turned back by the spindle at one end portion, accommodated in a bend route provided in the lock member, and wound around an outer peripheral surface of the spindle, such that the second energy absorbing member passes through the bend route when the spindle rotates in accordance with the twisting deformation of the first energy absorbing member while the lock member is locked during the emergency, thereby undergoing local plastic deformation so as to absorb the impact energy, wherein a deformation portion that deforms when the spindle rotates while the lock member is locked during the emergency is provided between the spindle and a turned back portion of the second energy absorbing member or on a part of the spindle that contacts the turned back portion of the second energy absorbing member.

(2) The seatbelt device according to (1), wherein the deformation portion is formed from any of rubber, elastomer resin, and foam metal disposed between the spindle and the turned back portion of the second energy absorbing member.

(3) The seatbelt device according to (1), wherein the deformation portion is a thin crush rib that is formed on the part of the spindle that contacts the turned back portion of the second energy absorbing member and is crushed when the spindle rotates during the emergency.

(4) The seatbelt device according to (1), wherein the deformation portion is a hole provided in the vicinity of a contact portion of the spindle, which is contacted by the second energy absorbing member during the emergency, in order to reduce a rigidity of the contact portion.

(5) The seatbelt device according to (1), wherein the deformation portion is a pipe member disposed between the spindle and the second energy absorbing member.

(6) The seatbelt device according to (1), wherein the second energy absorbing member is constituted by a pair of second energy absorbing members disposed in positions differing from each other by a phase of 180° about a center of the spindle.

(7) A seatbelt device including:

a spindle attached to a retractor frame to be free to rotate, a webbing being wound around an outer periphery thereof;

a lock member that can rotate relative to the refractor frame and can be locked to the retractor frame during an emergency;

emergency locking means for preventing the spindle from rotating in a webbing unreeling direction during the emergency by engaging the lock member with the refractor frame;

a first energy absorbing member that is attached to the spindle by one axial direction end portion and attached to the lock member by another axial direction end portion, and absorbs an impact energy by undergoing twisting deformation when a load of at least a predetermined value acts on the spindle in the webbing unreeling direction while the lock member is locked by the emergency locking means during the emergency, thereby permitting relative rotation between the spindle and the lock member; and a second energy absorbing member that is formed in a strip form or a wire form, fixed to and turned back by the spindle at one end portion, accommodated in a bend route provided in the lock member, and wound around an outer peripheral surface of the spindle, such that the second energy absorbing member passes through the bend route when the spindle rotates in accordance with the twisting deformation of the first energy absorbing member while the lock member is locked during the emergency, thereby undergoing local plastic deformation so as to absorb the impact energy, wherein the second energy absorbing member includes a plurality of second energy absorbing members which are wound, by different lengths, around the outer peripheral surface of the spindle on another end portion side of the bend route.

With the seatbelt device according to the present invention, the deformation portion is provided between the spindle and the turned back portion of the second energy absorbing member or on the part of the spindle that contacts the turned back portion of the second energy absorbing member. Therefore, when the spindle rotates in a state where the emergency locking means has been activated to lock the lock member during an emergency, the deformation portion deforms, and as a result, an impact generated at the moment when a gap between the second energy absorbing member and the spindle disappears can be suppressed. Hence, unstable load variation during an initial stage of an operation of a two-stage control type seatbelt device can be suppressed, and as a result, an occupant can be protected effectively and safely.

The deformation portion is preferably constituted by any one of rubber, elastomer resin, and foam metal, a thin crush rib that is crushed when the spindle rotates, a hole provided near the contact portion of the spindle that is contacted by the second energy absorbing member, or a pipe member. Thus, unstable load variation during the initial stage of the operation of the seatbelt device can be reduced efficiently, and as a result, the occupant can be protected effectively and safely.

Further, the pair of second energy absorbing members are disposed in symmetrical positions about the center of the spindle, and therefore loads acting on tip end portions of the second energy absorbing members cancel each other out, regardless of a phase (a locking phase) at which the spindle engages with the retractor frame. Hence, a vector acting on a bearing portion of the spindle can be made constant. As a result, variation in frictional resistance generated by the bearing portion on the basis of the locking phase of the spindle can be suppressed, and therefore unstable load variation during the initial stage of the operation of the two-stage control type seatbelt device can be suppressed.

DETAILED DESCRIPTION

Embodiments of a seatbelt device according to the present invention will be described in detail below on the basis of the drawings.

First Embodiment

Figure 1:
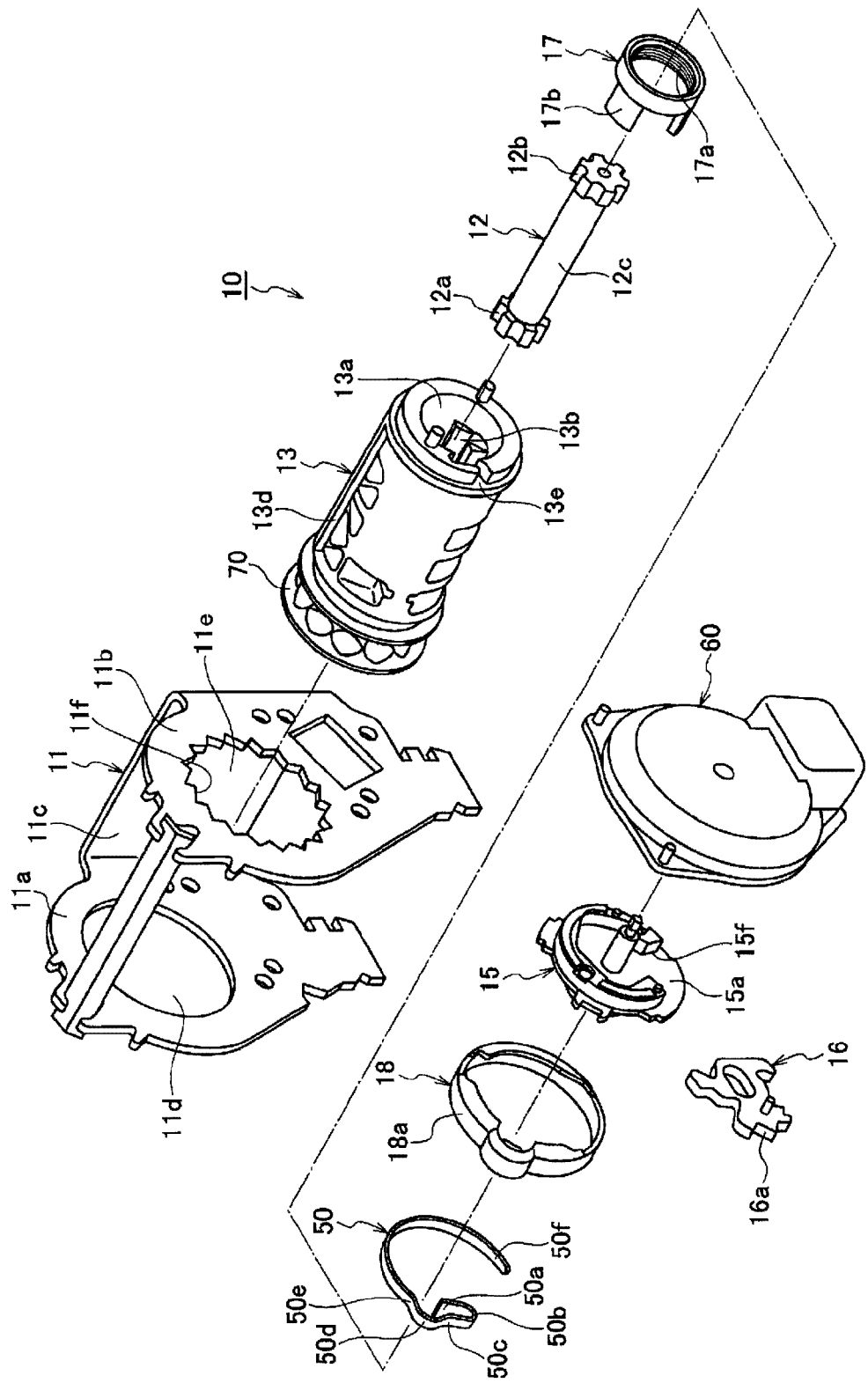
FIG. 1 is an exploded perspective view showing the main parts of a seatbelt device according to a first embodiment of the present invention.
Figure 2:
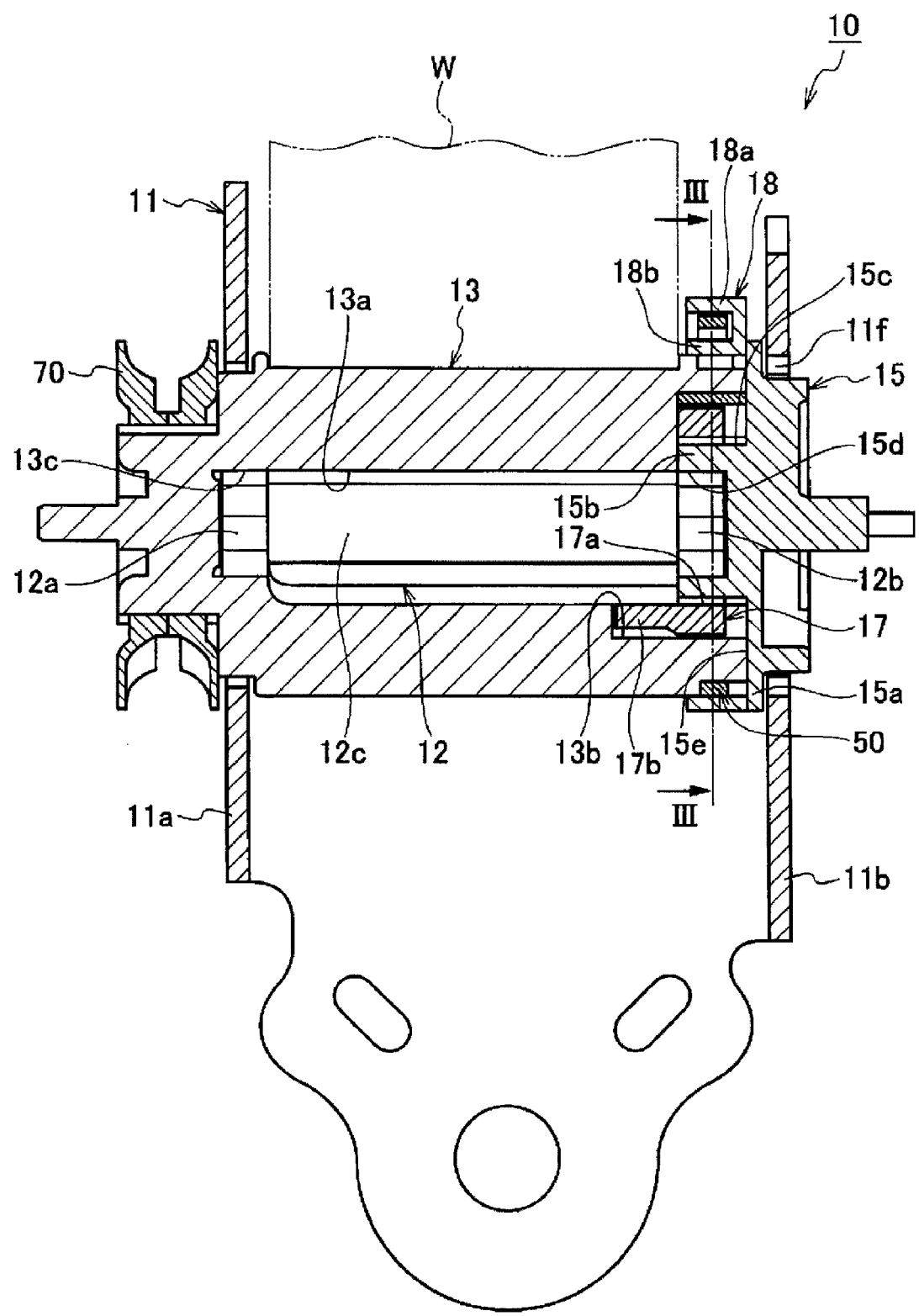
FIG. 2 is a sectional view illustrating some of the main parts of the seatbelt device shown in FIG. 1.
Figure 3:
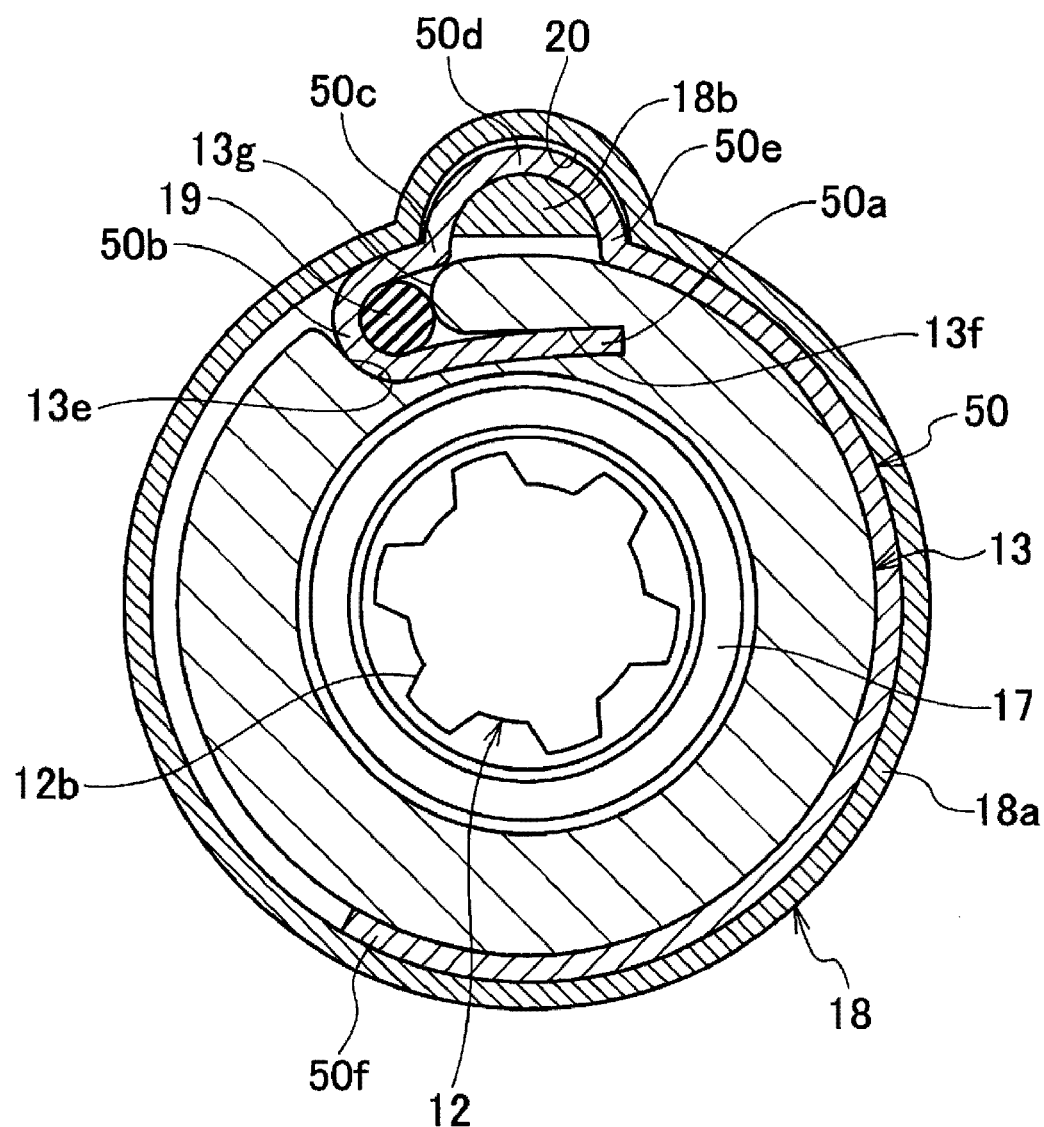
FIG. 3 is a sectional view generally taken along line III-III in FIG. 2.

FIG. 1 is an exploded perspective view showing the main parts of a seatbelt device according to a first embodiment of the present invention, FIG. 2 is a sectional view showing the main parts of the seatbelt device, and FIG. 3 is a sectional view taken generally along line III-III line in FIG. 2.

As shown in FIG. 1, a seatbelt device 10 includes a retractor frame 11 attached to a vehicle body (not shown), a substantially cylindrical spindle 13 attached to the retractor frame 11 to be free to rotate and having a webbing W wound around an outer periphery thereof, a torsion bar 12 serving as a first energy absorbing member that is mounted in the spindle 13 so as to extend along an axial center of the spindle 13 and joined integrally to the spindle 13 by one axial direction end portion thereof, and a tread head 15 serving as a lock member that is joined integrally to the other axial direction end portion of the torsion bar 12.

The retractor frame 11 is formed by press-molding a metal plate such that left and right side plates 11a, 11b stand upright from either side of a back plate 11c which is fixed to the vehicle body. Thus, the refractor frame 11 has a substantially C-shaped cross-section. Through holes 11d, 11e are provided in opposing positions of the left and right side plates 11a, 11b, and the spindle 13 having the torsion bar 12 joined thereto is inserted into and supported by the through holes 11d, 11e to be free to rotate.

A pretensioner (in FIG. 1, a reference numeral 70 denotes a pretension ring) that rotates the spindle 13 in a webbing retraction direction during a vehicle emergency such as a collision in order to remove looseness in the webbing W, and a retraction spring device, not shown in the drawings, that permanently biases the spindle 13 in the webbing retraction direction are provided on an outer side of one of the side plates 11a of the retractor frame 11.

Emergency locking means 60 that prevents the spindle 13 from rotating in a webbing unreeling direction by engaging the tread head 15 with the retractor frame 11 during a vehicle emergency is provided on an outer side of the other side plate 11b of the retractor frame 11. Sensors for detecting the vehicle emergency, such as vehicle acceleration detecting means and webbing unreeling acceleration detecting means, are installed in the emergency locking means 60.

An accommodating recessed portion 13a for accommodating the torsion bar 12 is formed in a central portion of the spindle 13, and a slit 13d into which an end portion of the webbing W is fixedly inserted, are provided in a predetermined circumferential direction location of the spindle 13.

As shown in FIGS. 1 and 2, the tread head 15 includes a disc portion 15a having an axial direction side face 15e that opposes an end surface of the spindle 13, and a cylindrical portion 15b that projects to the spindle 13 side from the disc portion 15a, a male screw portion 15c being formed on an outer peripheral surface thereof and a joining hole 15d for joining the tread head 15 to the spindle 13 being formed in an inner peripheral surface thereof. Further, an accommodating portion 15f is formed on a surface of the disc portion 15a on the opposite side to the side facing the spindle 13, and a pawl 16 serving as an engaging member is mounted in the accommodating portion 15f. Latch teeth 16a, capable of engaging with inner teeth 11f formed in a peripheral edge portion of the through hole 11e in the refractor frame 11, are formed in the pawl 16.

A spindle joint portion 12a that is joined to a joining hole 13c provided in the accommodating recessed portion 13a of the spindle 13 is formed on one axial direction end (an opposite side end to the tread head 15) of the torsion bar 12, and a tread head joint portion 12b that is joined to the joining hole 15d in the tread head 15 is formed on the other axial direction end (the tread head 15 side end) of the torsion bar 12. The spindle joint portion 12a and the tread head joint portion 12b have a torx shape (in which irregularities are formed on the outer periphery; in the illustrated examples, six indentations and six projections are formed), and by fitting the spindle joint portion 12a and the tread head joint portion 12b respectively into the joint hole 13c of the spindle 13 and the joint hole 15d of the tread head 15, which are shaped correspondingly, joints are formed therebetween.

Under normal conditions, the tread head 15 is capable of rotating relative to the retractor frame 11, but when the emergency locking means 60 is activated during a vehicle emergency, the latch teeth 16a of the pawl 16 engage with the inner teeth 11f of the retractor frame 11 such that the tread head 15 is locked to the retractor frame 11. As a result, rotation of the tread head 15 is restrained, and therefore the spindle 13 is prevented from rotating in the webbing unreeling direction. At this time, a torque of at least a predetermined value acts between the two joint portions 12a, 12b of the torsion bar 12 due to an unreeling direction load acting on the webbing W, and as a result, a deformation portion 12c between the joint portions 12a, 12b begins to twist. Accordingly, the webbing W is allowed to unreel by a predetermined amount while a predetermined tension is applied to the webbing W, and therefore impact energy acting on the body of an occupant is absorbed.

Further, a limiting member 17 capable of rotating integrally with the spindle 13 and sliding relative to the spindle 13 in the axial direction is provided in a fitting recessed portion 13b formed in the tread head 15 side end portion of the spindle 13.

The limiting member 17 has a female screw portion 17a formed on an inner surface thereof and a rib 17b projecting in the axial direction. The limiting member 17 is formed such that the female screw portion 17a is screwed to the male screw portion 15c of the tread head 15 and the rib 17b is fitted to be free to slide into the fitting recessed portion 13b formed in the tread head 15 side end portion of the spindle 13. Thus, the limiting member 17 is capable of sliding relative to and rotating integrally with the spindle 13. When the limiting member 17 rotates in accompaniment with the spindle 13, the limiting member 17 is moved in the axial direction by an action of the female screw portion 17a screwed to the male screw portion 15c of the tread head 15.

Further, as shown in FIG. 3, a bending element 50 serving as a second energy absorbing member that generates tension in the webbing W from a point at which the webbing W starts to unreel to a point at which the webbing W has unreeled by a predetermined amount is mounted on the tread head 15 side end portion of the spindle 13 between the spindle 13 on one side and the tread head 15 and a cover 18 on the other side.

The bending element 50 is formed from a substantially C-shaped strip-form plate material made of a metal such as stainless steel (SUS), aluminum, or steel, for example. Note that the bending element 50 may be formed from a wire material made of stainless steel (SUS), aluminum, steel, or the like. In the bending element 50, a turned back portion 50b turned back into a U shape in a circumferential direction is provided between one end portion 50a fixed to the spindle 13 and a first bend portion 50c that contacts an inner surface of the cover 18. In other words, the bending element 50 does not extend directly from the end portion 50a to another end portion 50f, but first extends to an opposite side to the other end portion 50f side and then makes a U turn back to the first bend portion 50c. A curved portion 50d is formed between the first bend portion 50c and a second bend portion 50e. The first bend portion 50c and the second bend portion 50e are positioned on a substantially identical circumference.

The cover 18 is fixed integrally to the outer periphery of the tread head 15. A peripheral wall portion 18a is provided on a peripheral edge portion of the cover 18, and a part (an upper side location in FIG. 3) of the peripheral wall portion 18a projects to an outer peripheral side in accordance with the curved portion 50d of the bending element 50. A curved wall 18b that supports the curved portion 50d of the bending element 50 from an inner peripheral side is provided on the inner peripheral side of the location where the peripheral wall portion 18a projects to the outer peripheral side. In other words, a bend route 20 that bends outward in a radial direction is formed by an inner surface of the outer peripheral side projecting portion of the peripheral wall portion 18a and the curved wall 18b. Note that the cover 18 and the tread head 15 may be constituted by a single member, and the cover 18 according to this embodiment serves as a part of the lock member according to the present invention.

As shown in FIG. 3, the spindle 13 is provided with a radial direction groove 13e that extends from a predetermined outer peripheral location of the spindle 13 to the inner peripheral side and a circumferential direction groove 13f that extends in the circumferential direction from a bottom portion of the radial direction groove 13e. A circumferential direction groove width of the radial direction groove 13e is considerably greater than a thickness of the bending element 50.

The end portion 50a of the bending element 50 is inserted fixedly into the circumferential direction groove 13f. The turned back portion 50b of the bending element 50 is housed in the radial direction groove 13e, and a cylindrical rubber 19 serving as a deformation portion is provided between the U-shaped turned back portion 50b and one of the side walls defining the radial direction groove 13e. More specifically, the cylindrical rubber 19 serving as the deformation portion is provided between the turned back portion 50b of the bending element 50 and a side wall 13g disposed on a rear side when seen from a rotation direction of the spindle 13 during unreeling of the webbing, from among a pair of side walls defining the radial direction groove 13e.

Figure 4:
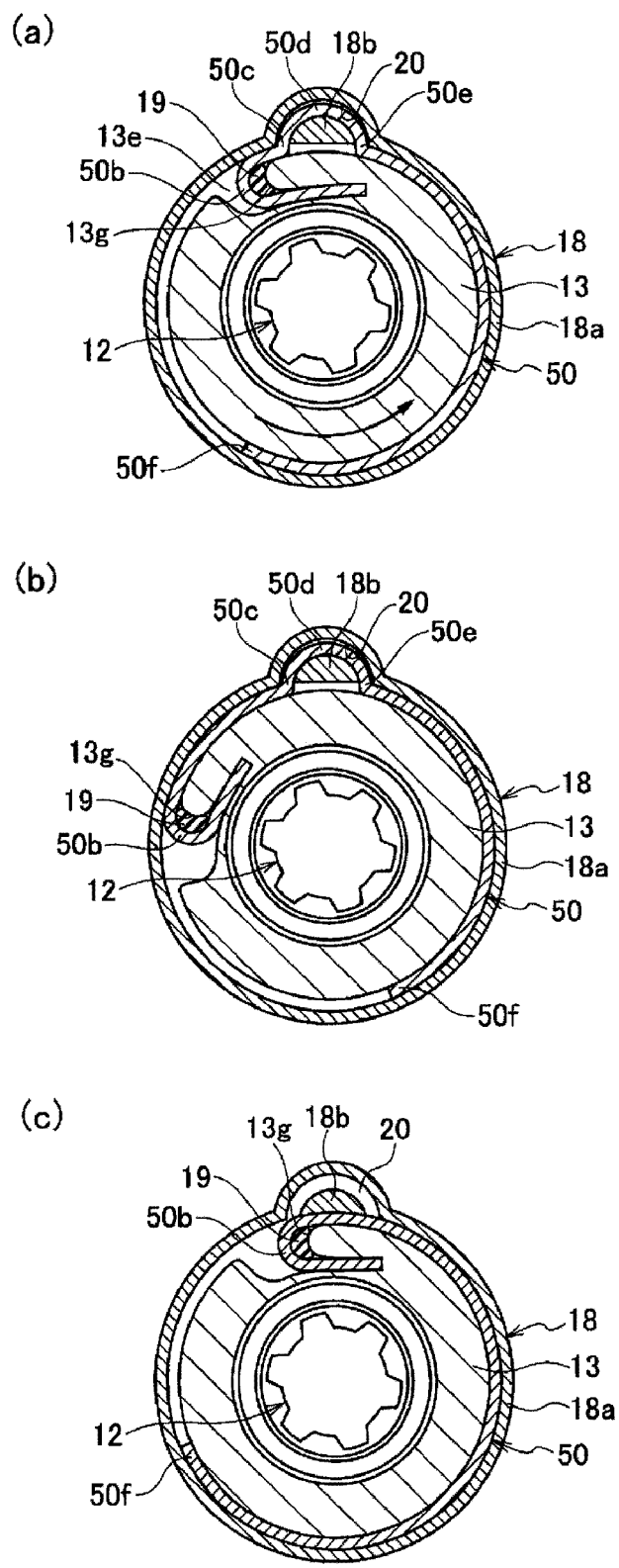
FIGS. 4A to 4C are sectional views showing the operation of a bending element serving as a second energy absorbing member.
Figure 5:
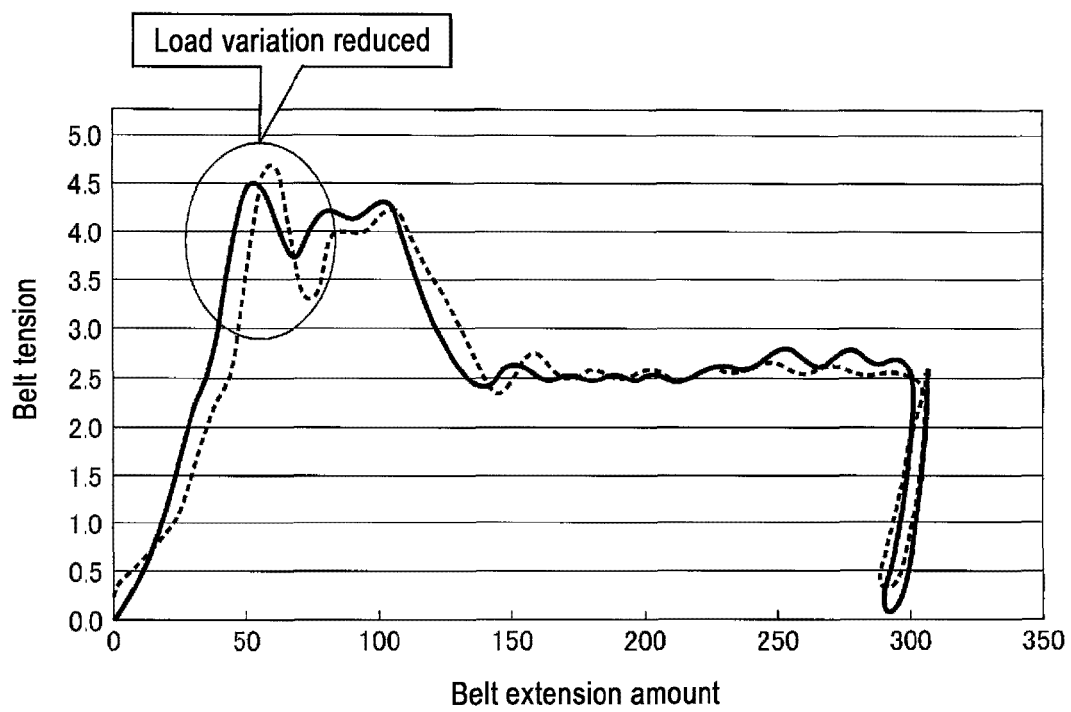
FIG. 5 is a graph showing a relationship between a webbing unreeling amount and a webbing tension in the seatbelt device according to the present invention and in comparison with a conventional seatbelt device, the latter of which is shown by the dotted line of the figure.

Next, an action of this embodiment will be described with reference to FIGS. 1 to 5. FIGS. 4A to 4C are sectional views showing an operation of the bending element serving as the second energy absorbing member, and FIG. 5 is a graph showing a relationship between a webbing unreeling amount and a webbing tension in the seatbelt device according to this embodiment in comparison with a conventional seatbelt device.

When a sensor, not shown in the drawings, for detecting a vehicle emergency is switched, the emergency locking means 60 cause the pawl 16 to rotate such that the latch teeth 16a of the pawl 16 engage with the inner teeth 11f of the retractor frame 11, thereby preventing the tread head 15 from rotating. At this time, the spindle 13 is prevented from rotating in the webbing unreeling direction via the torsion bar 12. When a load is exerted on the spindle 13 in the webbing unreeling direction by the inertia of the occupant during the collision or the like while the tread head 15 is prevented from rotating, a webbing tension F gradually increases, as shown by a solid line in FIG. 5. At this time, as shown in FIG. 2, the limiting member 17 is screwed to the male screw portion 15c of the tread head 15 and therefore positioned at a remove from the axial direction side face 15e of the tread head 15.

When the webbing tension F reaches a predetermined value, the torsion bar 12 begins to twist, and this twisting deformation causes the spindle 13 to rotate relative to the tread head 15 such that the webbing W is unreeled. Hence, when the torsion bar 12 twists, impact energy generated by the collision or the like is absorbed. In other words, the torsion bar 12 acts as the first energy absorbing member for absorbing impact energy.

Further, as the torsion bar 12 twists, the limiting member 17 rotates integrally with the spindle 13, and therefore the limiting member 17 begins to move in the axial direction (a direction heading toward the disc portion 15a of the tread head 15; a rightward direction in FIG. 2) along the male screw portion 15c of the tread head 15, to which the limiting member 17 is screwed.

When the spindle 13 rotates in a counter-clockwise direction from the state shown in FIG. 3 as the torsion bar 12 twists, the cylindrical rubber 19 is pressed between the rear side wall 13g of the radial direction groove 13e in the spindle 13 and the turned back portion 50b of the bending element 50 so as to be elastically deformed, as shown in FIG. 4A. Hence, the turned back portion 50b of the bending element 50 and the rear side wall 13g of the radial direction groove 13e contact each other via the cylindrical rubber 19, and therefore an impact force generated at the moment of contact is mitigated by an elastic force of the cylindrical rubber 19. In other words, as shown in FIG. 5, a peak value of the webbing tension F (solid line) in the seatbelt device 10 according to this embodiment is suppressed to be lower than the peak value of the webbing tension F (dotted line) in the conventional seatbelt device.

At this time, the bending element 50 deforms slightly around the end portion 50*a* and the turned back portion 50*b*, but the other parts thereof remain static together with the tread head 15. A resistance force generated by the bending element 50 to suppress rotation of the spindle 13 remains small during this period. While the cylindrical rubber 19 is elastically deformed by being pressed against the rear side wall 13*g* of the spindle 13, the spindle 13 rotates by a predetermined amount, and as a result, static frictional resistance acting on the webbing W changes to kinetic frictional resistance.

As shown in FIG. 4B, when the spindle 13 rotates further, the bending element 50 rotates together with the spindle 13 so as to pass through the bend route 20. Thus, the first bend portion 50*c* and second bend portion 50*e* of the bending element 50 are bent while passing between the peripheral wall portion 18*a* of the cover 18 and the spindle 13, and as a result, energy is absorbed.

As the spindle 13 rotates, respective positions (positions on the bend route 20) of the first bend portion 50*c*, the curved portion 50*d*, and the second bend portion 50*e* of the bending element 50 deviate gradually toward the other end portion 50*f* side of the bending element 50, as shown in FIG. 4B. In other words, the bending element 50 absorbs energy by passing through the bend route 20 (between the static peripheral wall portion 18*a* and curved wall 18*b* of the cover 18) while undergoing plastic deformation. Hence, the bending element 50 acts as the second energy absorbing member for absorbing impact energy.

As shown in FIG. 4C, when the spindle 13 rotates further, the other end portion 50*f* of the bending element 50 passes through the bend route 20. In the state shown in FIG. 4C, the spindle 13 has substantially completed a single revolution from the initial state (see FIG. 3), and in this state, energy absorption is no longer performed by the bending element 50. Accordingly, the webbing tension F decreases to the load generated by the twisting deformation of the torsion bar 12, and thereafter, energy is absorbed by the twisting deformation of the torsion bar 12.

Meanwhile, as shown in FIG. 2, the limiting member 17 screwed to the male screw portion 15*c* of the tread head 15 is moved in the rightward direction of the drawing by the screw action that accompanies rotation of the spindle 13, but eventually, the limiting member 17 contacts the axial direction side face 15*e* of the tread head 15 such that further movement thereof is restricted. As a result, rotation of the spindle 13 relative to the tread head 15 is restricted. In other words, the limiting member 17 functions as a stopper member for stopping rotation of the spindle 13.

With the seatbelt device 10 according to this embodiment, as shown in FIG. 5, the webbing tension F generated in the webbing W in the initial stage of the operation (up to a webbing extension amount of approximately 120 mm in FIG. 5) is a comparatively large tension constituted by a sum total of the tension generated by the twisting deformation of the torsion bar 12 (the first energy absorbing member) and the torsion generated by the plastic deformation of the bending element 50 (the second energy absorbing member), whereas in a later stage (from a webbing extension amount of approximately 120 mm in FIG. 5), a comparatively small tension is applied by the twisting deformation of the torsion bar 12 alone. In other words, the webbing tension F is controlled in two stages, and as a result, the occupant is protected effectively and safely.

Further, the cylindrical rubber 19 is disposed between the turned back portion 50*b* of the bending element 50 and the rear side wall 13*g* of the radial direction groove 13*e*, and therefore the impact force generated at the moment of contact between the bending element 50 and the spindle 13 is mitigated by the elastic force of the cylindrical rubber 19. Hence, as shown in FIG. 5, the peak value of the webbing tension F (solid line) in the seatbelt device 10 according to this embodiment is suppressed below the peak value of the webbing tension F (dotted line) in the conventional seatbelt device. As a result, unstable load variation with regard to the webbing tension can be suppressed during the initial stage of the operation of the seatbelt device 10.

Furthermore, when the operation of the bending element 50 (the second energy absorbing member) is complete, variation in the webbing tension generated by the twisting deformation of the torsion bar 12 (the first energy absorbing member) is similar to that of the conventional seatbelt device, and it can therefore be confirmed that the cylindrical rubber 19 does not influence this variation. Hence, it is evident that the cylindrical rubber 19 is effective in stabilizing the operation of the seatbelt device 10.

Note that the cylindrical rubber 19 serving as the deformation portion may be formed from elastomer resin or foam metal having a similar shape. Further, the cylindrical rubber 19 (deformation portion) may take a sectional shape other than a circular cross-section.

Figure 6:
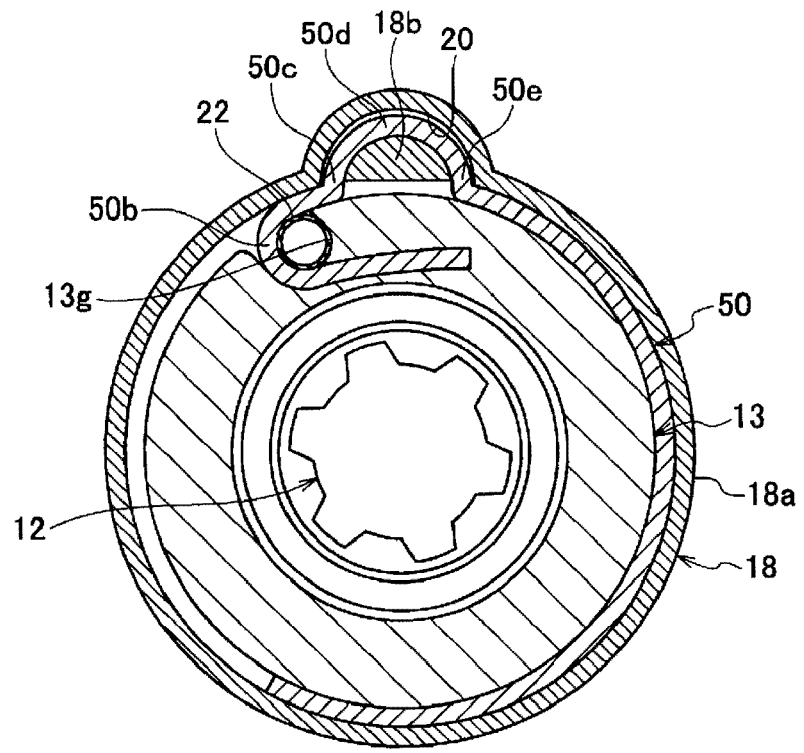
FIGS. 6A and 6B are sectional views showing a first modified example of a deformation portion.
Figure 6:
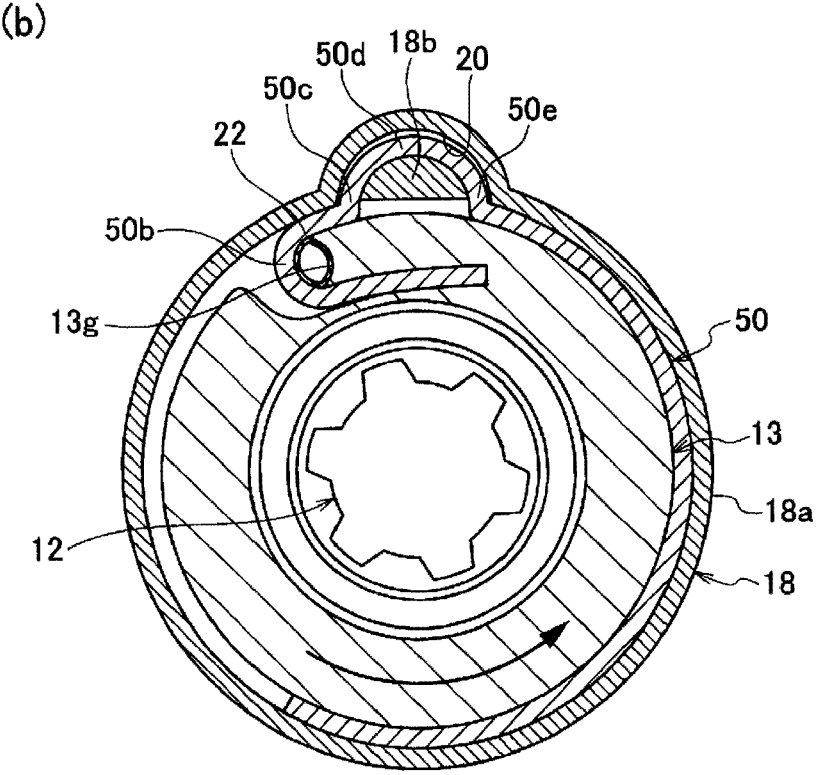

For example, as shown in FIG. 6A, a pipe member 22 such as a narrow diameter steel pipe or a non-ferrous metal pipe may be used as a first modified example of the deformation portion. In this case, the rear side wall 13*g* of the spindle 13 is formed in a recessed shape to conform to the outer shape of the pipe member 22. As shown in FIG. 6B, the pipe member 22 is pressed against the turned back portion 50*b* of the bending element 50 when the spindle 13 rotates during an emergency, thereby undergoing plastic deformation, and as a result, the impact force generated at the moment of contact between the bending element 50 and the pipe member 22 is mitigated. Thus, variation in the webbing tension is stabilized.

Figure 7:
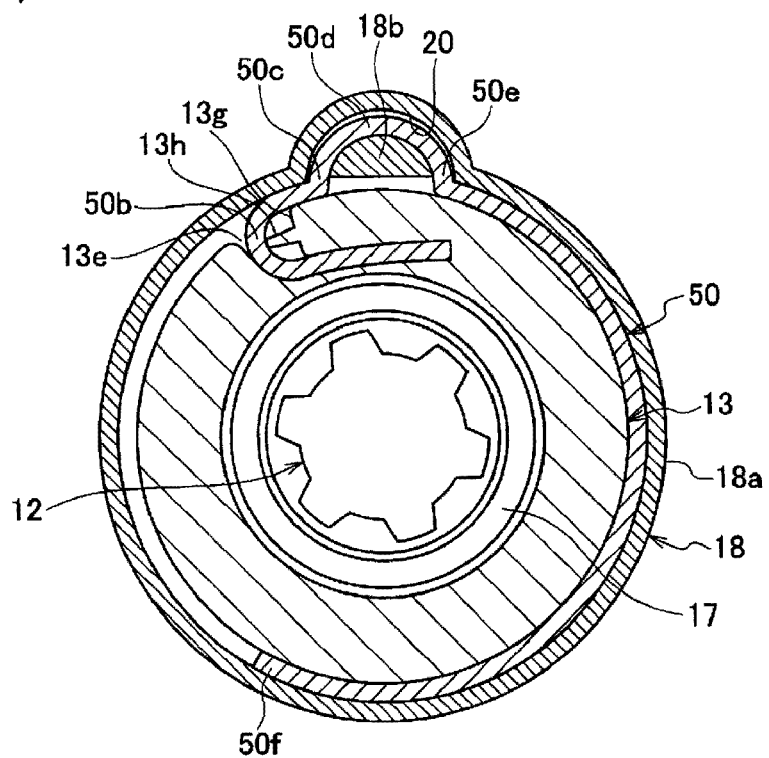
FIGS. 7A and 7B are sectional views showing a second modified example of the deformation portion utilized in the present invention.
Figure 7:
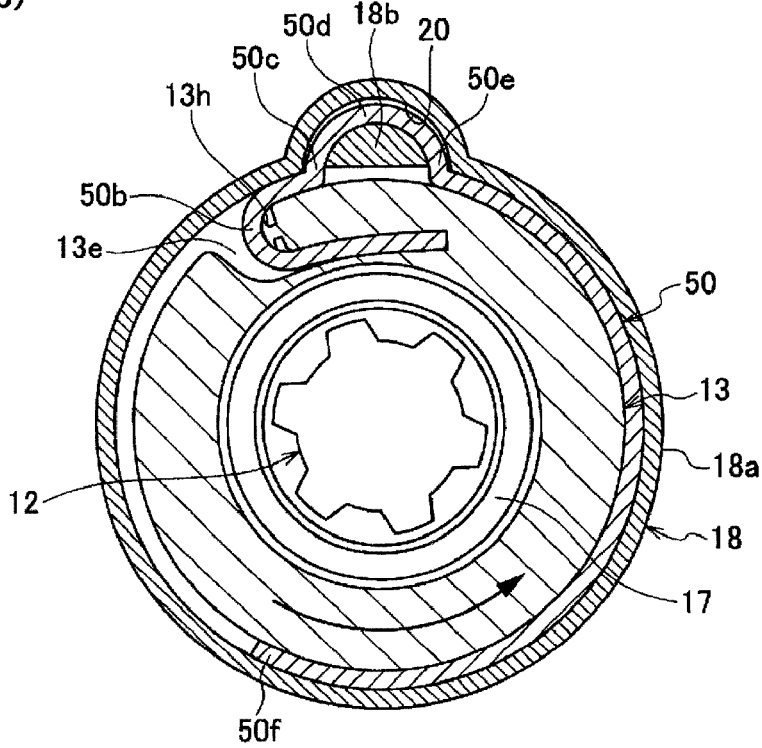

Further, the deformation portion is provided as a separate member between the rear side wall 13*g* of the spindle 13 and the turned back portion 50*b* of the bending element 50, but the deformation portion may be provided directly on the rear side wall 13*g* of the spindle 13 that contacts the turned back portion 50*b* of the bending element 50. More specifically, as shown in FIG. 7A, a thin crush rib 13*h* formed to project forward in the rotation direction from the rear side wall 13*g* of the spindle 13 may be provided as a second modified example of the deformation portion. As shown in FIG. 7B, the crush rib 13*h* is pressed against and crushed by the turned back portion 50*b* of the bending element 50 when the spindle 13 rotates during an emergency. By crushing the crush rib 13*h* during an emergency in this manner, the impact force generated at the moment of contact between the bending element 50 and the spindle 13 is mitigated, and as a result, variation in the webbing tension is stabilized.

Figure 8:
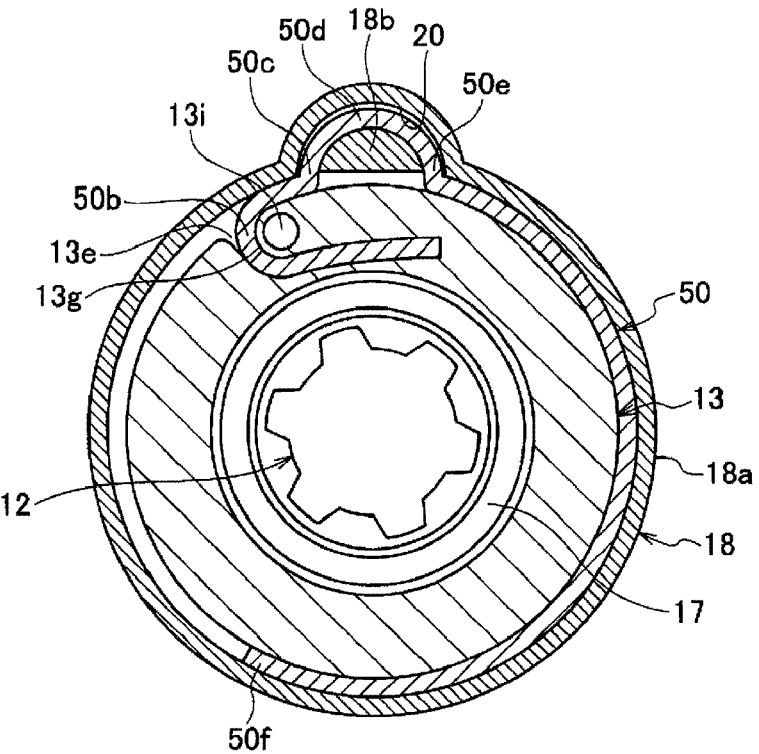
FIGS. 8A and 8B are sectional views showing a third modified example of the deformation portion utilized in the present invention.
Figure 8:
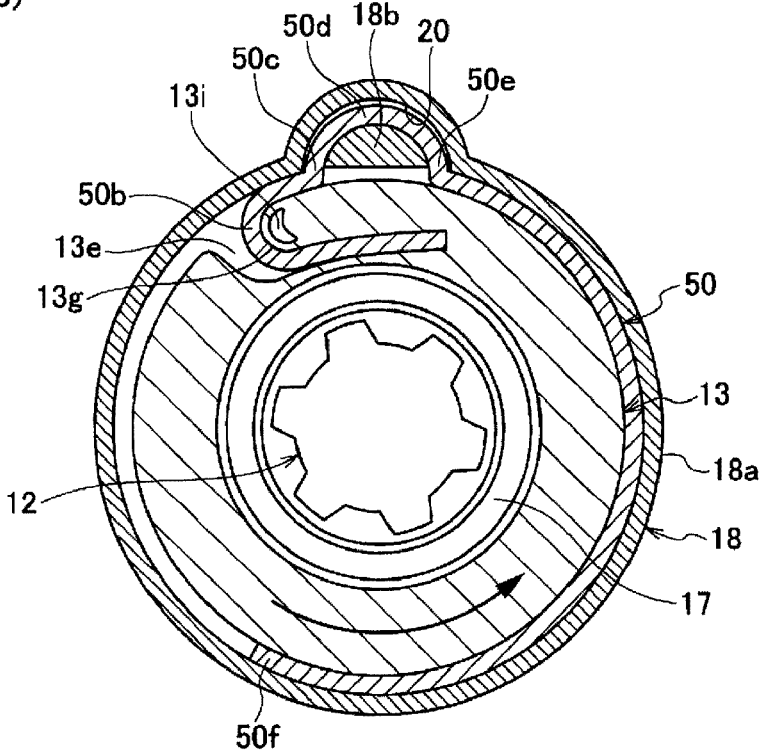

Further, as shown in FIG. 8A, a hole 13*i* may be provided in the vicinity of the rear side wall 13*g* of the spindle 13 and a tip end portion of the rear side wall 13*g* may be reduced in thickness as a third modified example of the deformation portion. A rigidity (in particular a circumferential direction rigidity) of the rear side wall 13*g* is reduced by the hole 13*i*, and therefore, as shown in FIG. 8B, the rear side wall 13*g* is pressed against the turned back portion 50*b* of the bending element 50, thereby undergoing plastic deformation, when the spindle 13 rotates during an emergency. As a result, the impact force generated at the moment of contact between the bending element 50 and the rear side wall 13g of the spindle 13 is mitigated, and therefore variation in the webbing tension is stabilized.

Second Embodiment

Figure 9:
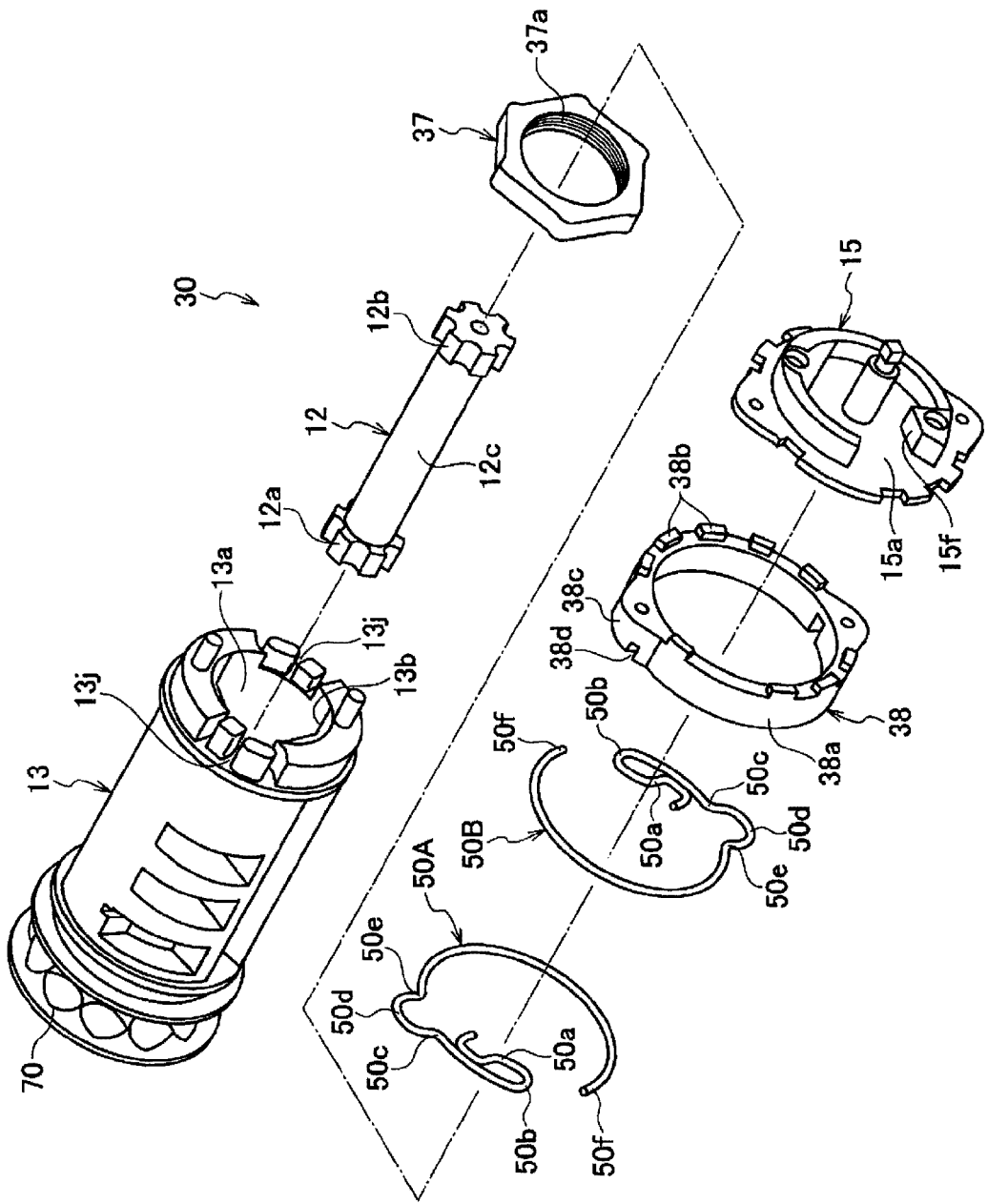
FIG. 9 is an exploded perspective view showing the main parts of a seatbelt device according to a further embodiment of the present invention.
Figure 10:
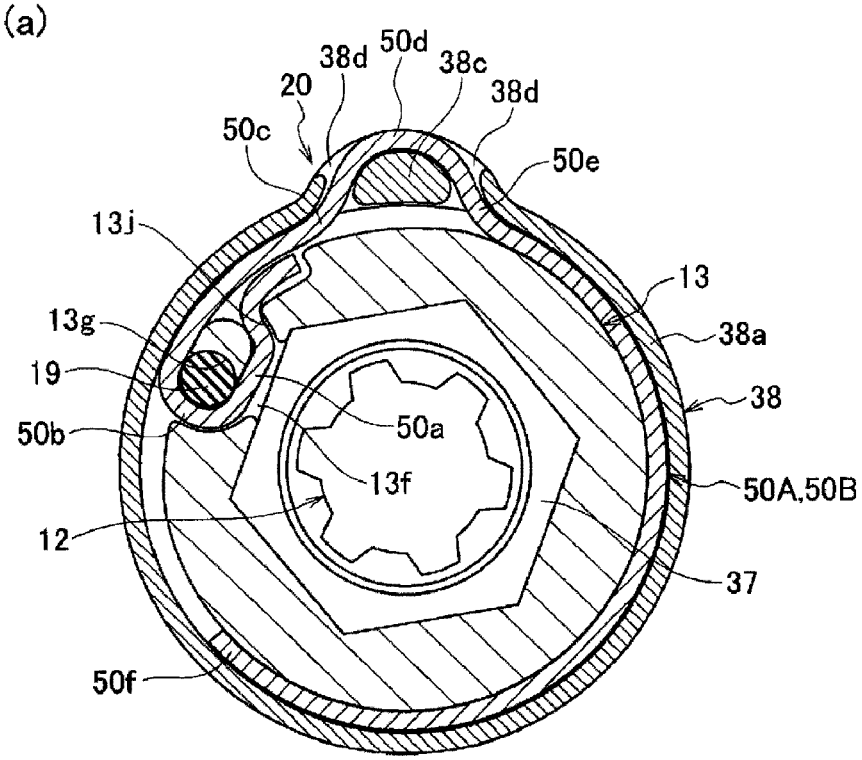
FIGS. 10A and 10B are sectional views showing the main parts of the seatbelt device shown in FIG. 9.
Figure 10:
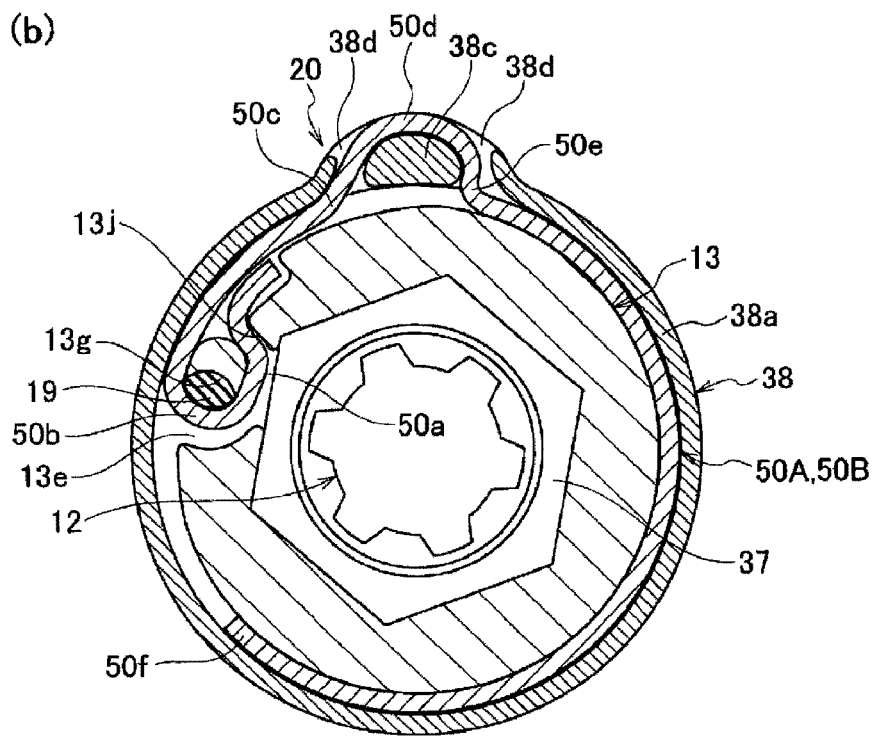

Next, a seatbelt device according to a second embodiment of the present invention will be described with reference to FIGS. 9, 10A, and 10B. FIG. 9 is an exploded perspective view showing the main parts of the seatbelt device according to the second embodiment. FIGS. 10A and 10B are sectional views showing the main parts of the seatbelt device shown in FIG. 9. Note that the seatbelt device according to the second embodiment differs mainly from the seatbelt device according to the first embodiment in that a pair of bending elements are used as the second energy absorbing member. Other parts are mostly shared with the seatbelt device of the first embodiment, and therefore identical parts have been allocated identical or corresponding reference symbols. Further, description of these parts has been simplified or omitted.

As shown in FIG. 9, a seatbelt device 30 according to the second embodiment includes a pair of bending elements 50A, 50B. The bending elements 50 are formed from a substantially C-shaped wire material made of a metal such as stainless steel (SUS), aluminum, or steel, for example. Similarly to the first embodiment, however, the bending elements 50A, 50B may be formed from a strip-form plate material made of stainless steel (SUS), aluminum, steel, or the like.

A cover (a lock member) 38 of the seatbelt device 30 is fixed integrally to the tread head 15 by engaging a plurality of latch portions 38b provided on an outer peripheral portion side face thereof as axial direction projections with engagement portions (not shown) formed on a spindle 13-side side face of the tread head 15. An outer peripheral portion 38a is provided on the outer peripheral portion of the cover 38. In FIG. 9, the outer peripheral portion 38a is cut away in an upper side location and a lower side location, and a substantially semicircular curved wall 38c that projects to the outer peripheral side is formed in the two cut-away portions. The curved walls 38c are formed in positions that differ from each other by a phase of 180° about the center of the cover 38. An opening portion 38d through which the bending elements 50A, 50B pass is formed between the peripheral wall portion 38a and the curved wall 38c.

As shown in FIGS. 10A and 10B, the cylindrical rubber 19 serving as the deformation portion is provided between the respective turned back portions 50b of the pair of bending elements 50A, 50B and the rear side wall 13g of the spindle 13, and one end portion 50a of the respective bending elements 50A, 50B is curved around and fixed to another radial direction groove 13j. Further, the bending elements 50A, 50B are passed through the opening portion 38d and wound around the outer peripheral side of the curved wall 38c and then mounted between the spindle 13 and the outer peripheral portion 38a of the cover 38. In other words, a pair of bend routes 20 that bend outwardly in the radial direction are formed by the peripheral wall portion 38a, the curved wall 38c, and the opening portion 38d. The pair of bend routes 20 are formed in symmetrical positions (a 180° phase) about the center of the spindle 13.

A limiting member 37 is a hexagonal nut member formed with a female screw portion 37a (see FIG. 9) on its inner surface. The limiting member 37 is fitted to be free to slide to a hexagonal fitting recessed portion 13b formed on the tread head 15 side end portion of the spindle 13 by screwing the female screw portion 37a to the male screw portion 15c of the tread head 15. As a result, the limiting member 37 is capable of sliding relative to and rotating integrally with the spindle 13, and therefore, when the limiting member 37 rotates in accompaniment with the spindle 13, the limiting member 37 is moved in the axial direction by the action of the female screw portion 37a screwed to the male screw portion 15c of the tread head 15. Thus, similarly to the limiting member 17 of the first embodiment, the limiting member 37 functions as a stopper member for stopping rotation of the spindle 13.

Next, an action of this embodiment, including the pair of bending elements 50A, 50B, will be described. In the seatbelt device 30 according to the second embodiment, the cylindrical rubber 19 is disposed between the respective turned back portions 50b of the bending elements 50A, 50B and the rear side wall 13g of the radial direction groove 13e, and therefore, when the spindle 13 rotates during an emergency, as shown in FIG. 10B, the cylindrical rubber 19 deforms elastically such that the impact force is mitigated by the elastic force of the cylindrical rubber 19. Hence, similarly to the seatbelt device 10 according to the first embodiment, unstable load variation can be suppressed during the initial stage of an operation of the seatbelt device 30.

Here, the spindle 13 rotates when the webbing W is unreeled, and therefore a relative phase between the refractor frame 11 and the spindle 13 is variable. Accordingly, an engagement position (locking phase) between the tread head 15 (the spindle 13) and the inner teeth 11f of the retractor frame 11 during an emergency is also variable.

Figure 11:
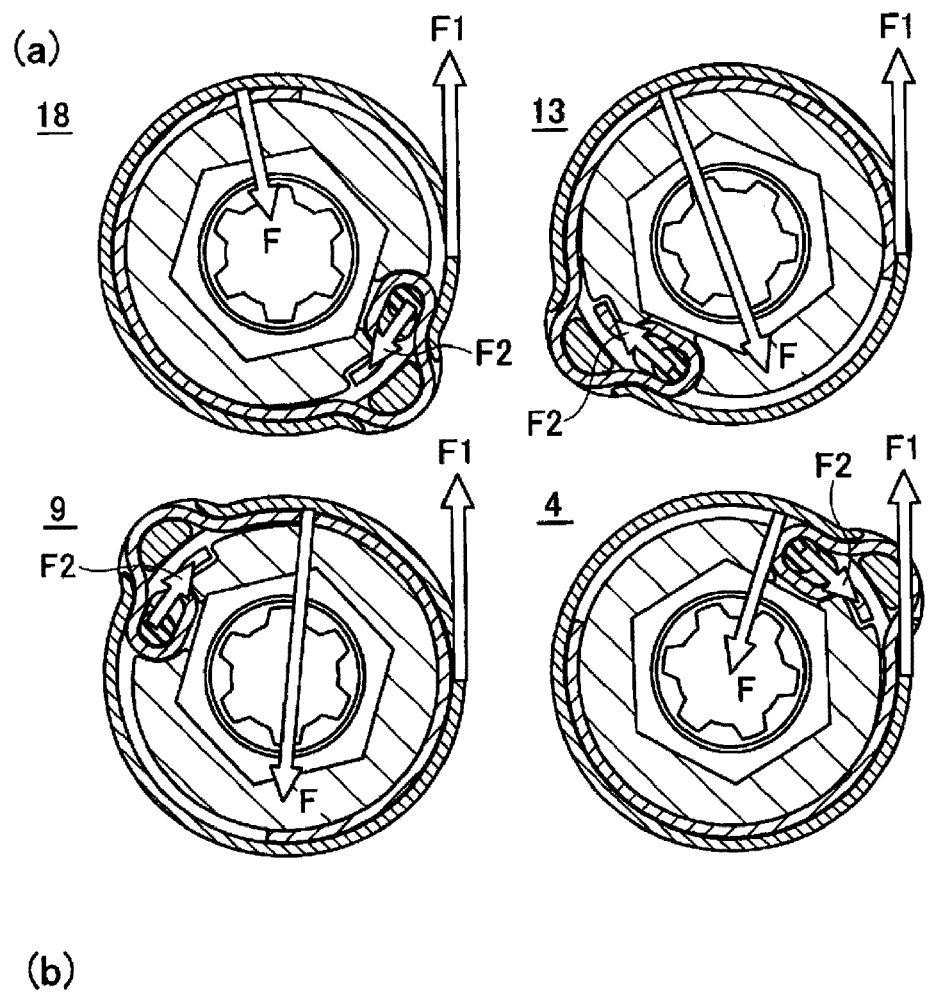
FIG. 11A is a sectional view illustrating differences in a vector of a force acting on a bearing portion of a spindle according to an engagement phase between a spindle and a retractor frame.
FIG. 11B is a side view showing engagement positions between the retractor frame and a tread head.
Figure 11:
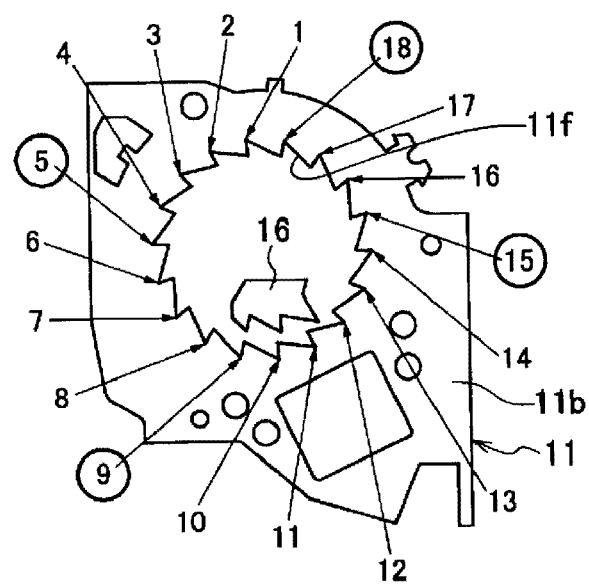

FIG. 11A is a view showing a vector of a force acting on the spindle 13 when the spindle 13 is engaged with (locked to) the retractor frame 11 at various phases with respect to engagement positions of the inner teeth 11f of the retractor frame 11 shown in FIG. 11B. A vector F acts on the spindle 13 in an opposite direction to a resultant vector of a vector F1 generated by unreeling of the webbing W and a vector F2 generated by the bending elements 50A, 50B.

As shown in FIG. 11A, the vector F1 is constant but the vector F2 generated by the bending elements 50A, 50B varies according to the locking phase of the spindle 13, and as a result, the vector F varies according to the locking phase. Hence, a frictional resistance of a bearing portion of the spindle 13 varies according to the locking phase, thereby affecting the webbing tension, and as a result, it may not be possible to obtain a stable webbing tension at all times.

In the seatbelt device 30 according to this embodiment, the pair of bending elements 50A, 50B are disposed in symmetrical positions about the center of the spindle 13, and therefore vectors F2 generated by the respective bending elements 50A, 50B cancel each other out. As a result, variation in the webbing tension caused by variation in the locking phase is prevented, and therefore a stable webbing tension is obtained at all times.

Figure 12:
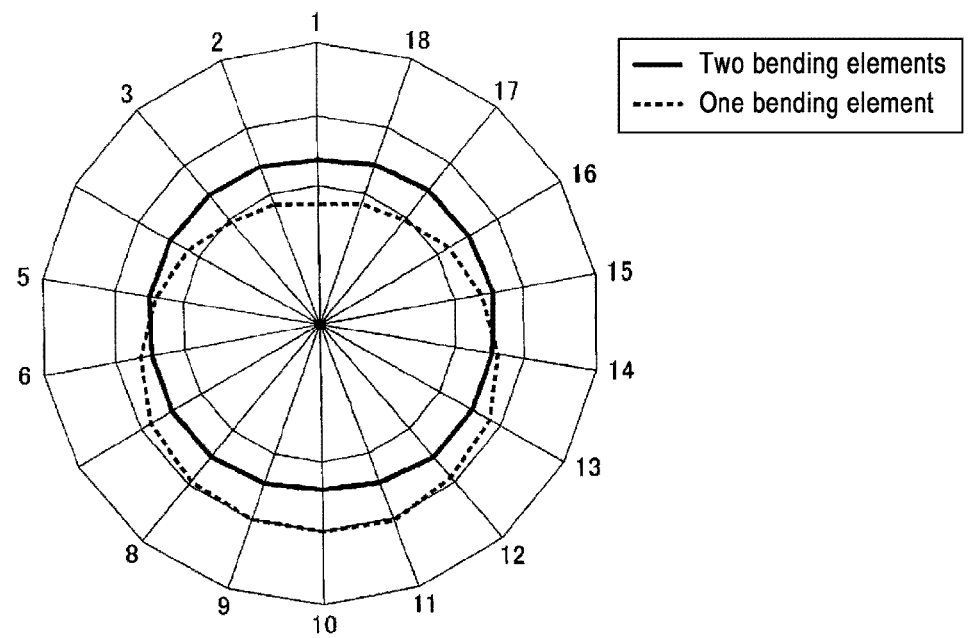
FIG. 12A is a graph showing a comparison of variation in the webbing tension corresponding to a lock phase between the seatbelt device shown in FIG. 9 and a conventional seatbelt device.
FIG. 12B is a graph showing the webbing tension in each engagement position.
Figure 12:
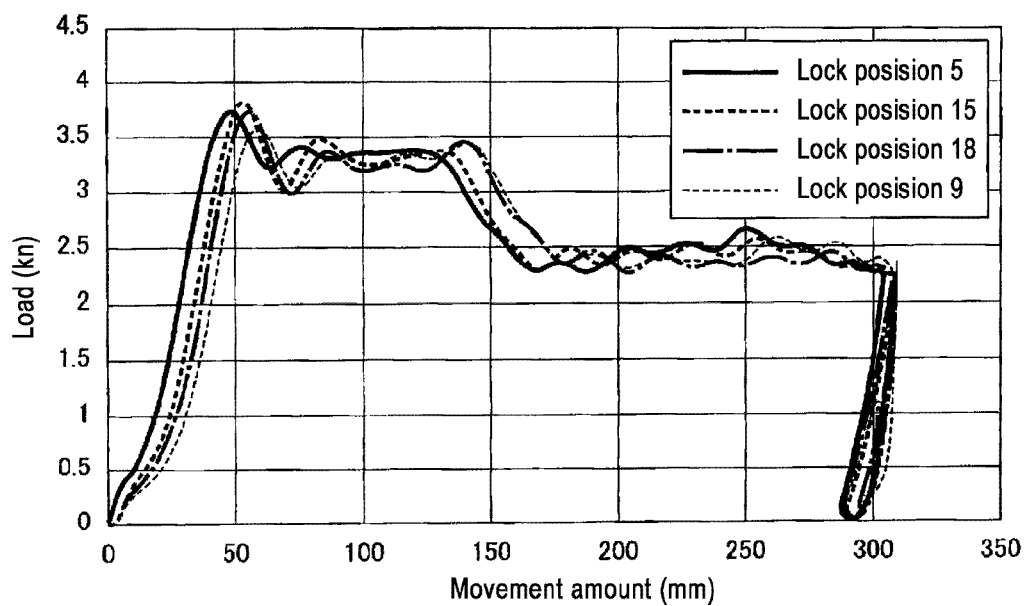

More specifically, as shown in FIG. 12A, when a single bending element is provided, a predicted webbing tension at each locking phase varies according to the locking phase (see dotted line), whereas in this embodiment, which includes the pair of bending elements 50A, 50B, the predicted webbing tension is substantially constant and stable regardless of the locking phase (see solid line). Note that numerals 1 to 18 in the drawing denote locking phases of the spindle shown in FIG. 11B.

To confirm this effect of the seatbelt device 30 according to this embodiment, which includes the pair of bending elements, the webbing tension was measured while varying the locking phase relative to the retractor frame 11. FIG. 12B is a graph showing the webbing tension measured in each locking position.

In the seatbelt device used during the measurement, the webbing tension generated by the torsion bar (the first energy absorbing member) was set at 2.5 kN. Further, a wire material having a diameter of 1.4 mm was used as the bending elements (the second energy absorbing member), and the webbing tension generated thereby was set at 1 kN. Hence, the webbing tension in the initial stage of the operation, during which both the torsion bar and the bending elements are active, was 3.5 kN. Note that the pair of bending elements were set at an identical length.

The spindle of the seatbelt device was locked in four locking positions (5, 9, 15 and 18) shown in FIG. 11B, and the webbing tension generated when the webbing W was unreeled at a speed of 7 m/s was measured. As shown in FIG. 12B, differences in the webbing tension between the locking positions were no more than 0.1 kN. Hence, the webbing tension remained substantially identical and stable regardless of the locking position, and therefore the effect obtained by providing a pair of bending elements was confirmed.

Third Embodiment

Figure 13:
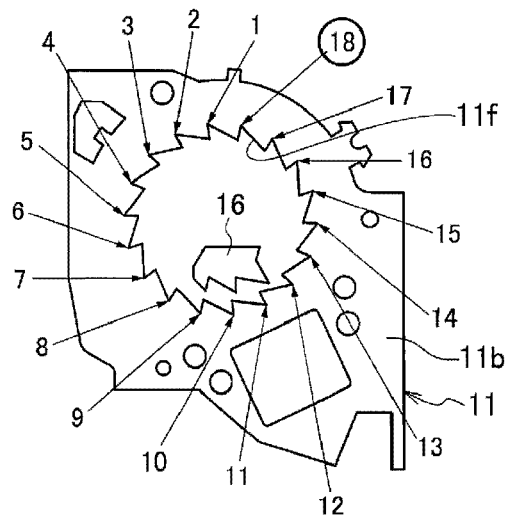
FIG. 13A is a side view showing engagement positions of a retractor frame in a seatbelt device according to a further embodiment.
FIG. 13B is a graph showing a comparison of the webbing tension between this seatbelt device and the seatbelt device according to the second embodiment.
Figure 13:
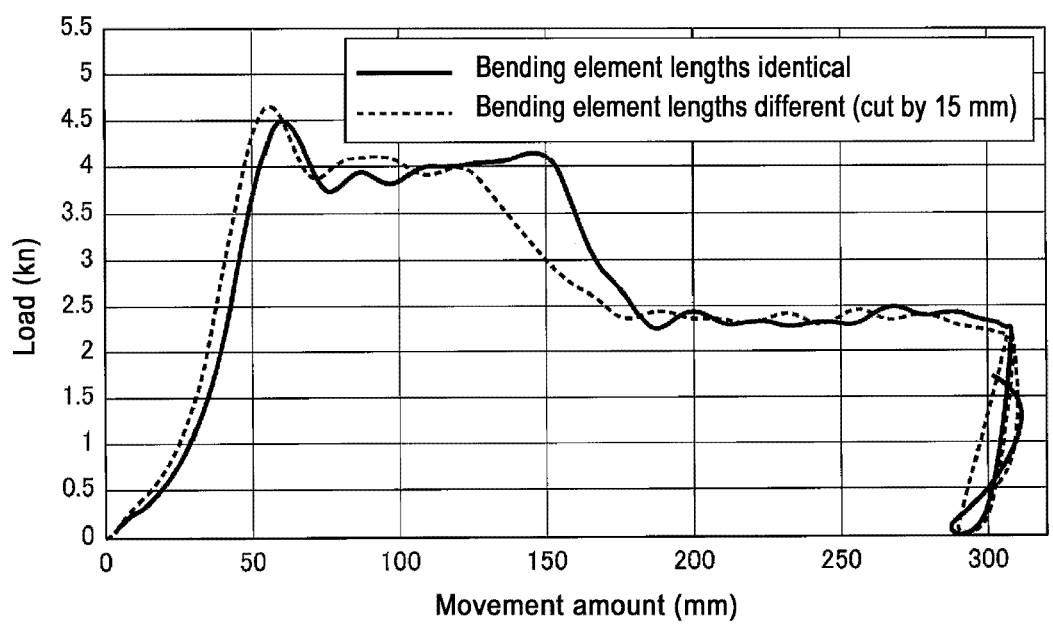
Figure 14:
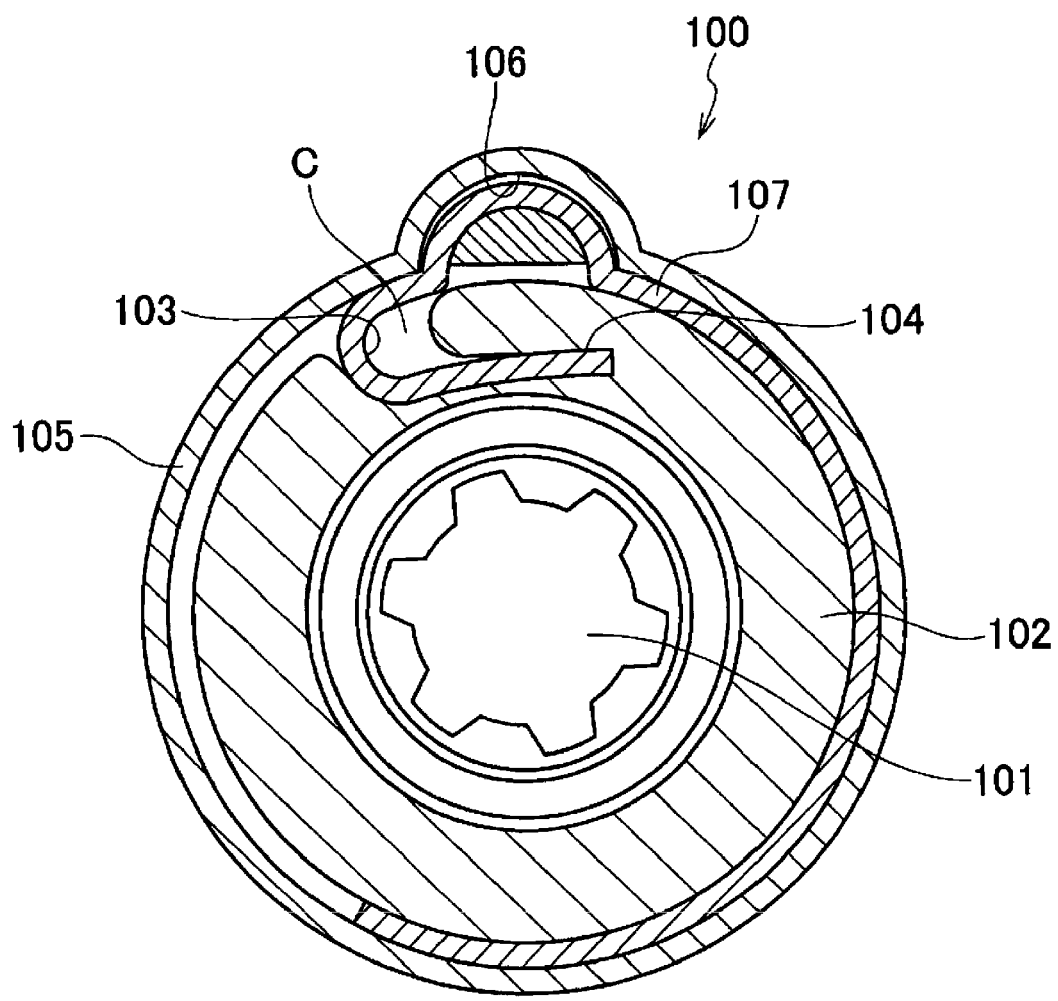
FIG. 14 is a sectional view of a conventional seatbelt device.

Next, a seatbelt device according to a third embodiment of the present invention will be described with reference to FIG. 13. Similarly to the seatbelt device 30 of the second embodiment, the seatbelt device according to this embodiment includes the pair of bending elements 50A, 50B. However, the seatbelt device according to this embodiment differs from the seatbelt device 30 of the second embodiment in that the pair of bending elements 50A, 50B are formed at different lengths.

Here, the aim of employing the pair of bending elements 50A, 50B having different lengths is to shift smoothly from the high webbing tension of the initial stage to a low webbing tension and thereby prevent deterioration of an injury value caused by rapid variation in the webbing tension. To confirm the effect of providing the pair of bending elements 50A, 50B having different lengths, the webbing tension was measured using a seatbelt device in which the length of one of the bending elements 50A was set to be 15 mm shorter than the length of the other bending element 50B. Note that the length difference was set at 15 mm in order to shift from a high tension to a low tension over a webbing unreeling amount of 60 mm.

In the seatbelt device used during the measurement, the webbing tension generated by the torsion bar 12 (the first energy absorbing member) was set at 2.5 kN. Further, a wire material having a diameter of 1.6 mm was used as the bending elements 50A, 50B (the second energy absorbing member), and the webbing tension generated thereby was set at 1.5 kN. Hence, the webbing tension in the initial stage of the operation, during which both the torsion bar 12 and the bending elements 50A, 50B are active, was 4.0 kN.

The webbing tension measured when the spindle of this seatbelt device was locked in a locking position 18 shown in FIG. 13A is indicated by a dotted line in FIG. 13B. Note that for comparison, the webbing tension of a seatbelt device having a pair of bending elements of identical lengths is shown by a solid line.

As shown by the solid line in FIG. 13B, with the pair of bending elements 50A, 50B having identical lengths, the respective actions of the pair of bending elements 50A, 50B end simultaneously, and therefore the high webbing tension (approximately 4 kN) generated when the torsion bar and the bending elements 50A, 50B act simultaneously shifts rapidly to the low webbing tension (2.5 kN) generated by the torsion bar alone. With the pair of bending elements 50A, 50B having different lengths, on the other hand, as shown by the dotted line in FIG. 13B, the long bending element 50A remains active after the action of the short bending element 50B is complete, and therefore the webbing tension decreases gently so as to shift from the high tension to the low tension over a webbing unreeling amount of approximately 60 mm. As a result, deterioration of the injury value caused by rapid variation in the webbing tension can be prevented.

Note that in the third embodiment, the respective lengths of the pair of bending elements 50A, 50B are made different, but it is sufficient for the lengths by which the bending elements 50A, 50B are wound around the outer peripheral surface of the spindle on the other end portion side of the bend route, or in other words the lengths of the respective parts of the bending elements 50A, 50B that pass through the bend route, to be different. Further, the effect described above is still obtained when the deformation portion of the first embodiment is not provided.

Note that the present invention is not limited to the embodiments and modified examples described above, and may be subjected to appropriate modifications, amendments, and so on.

Note that in the above embodiments, the bending element 50 serving as the second energy absorbing member is fixed to the spindle 13 by one end portion and turned back in a U shape in the circumferential direction. However, in a case where the end portion extends in the axial direction and is thereby fixed to the spindle 13, the end portion may be turned back by being bent at a right angle in the axial direction or turned back from a part that is parallel to the axial direction. Hence, the end portion may be turned back as desired in accordance with the method used to fix the end portion to the spindle 13.

This application is based on Japanese Patent Application No. 2008-319858, filed on Dec. 16, 2008, the contents of which are incorporated herein by reference.

The invention claimed is:

1. A seatbelt device comprising:
a refractor frame;
a spindle attached to the retractor frame and freely rotating with respect thereto, a webbing wound around an outer periphery of the spindle;
a lock member rotatable relative to the retractor frame and configured to be locked to the retractor frame during an emergency;
emergency locking means for preventing the spindle from rotating in a webbing unreeling direction during the emergency by engaging the lock member with the retractor frame;
a first energy absorbing member attached to the spindle at one axial end portion and attached to the lock member at an opposing axial end portion, said first energy absorbing member being configured to absorb an impact energy by undergoing twisting deformation when a load of at least a predetermined value acts on the spindle in the webbing unreeling direction while the lock member is locked by the emergency locking means during the emergency, thereby permitting relative rotation between the spindle and the lock member; and
a second energy absorbing member that is formed in one of a strip form and a wire form and wound around an outer peripheral surface of the spindle, the second energy absorbing member having a returnly bent portion adjacent to an end portion fixed to the spindle and another portion accommodated in a bend route provided in the lock member, such that the second energy absorbing member passes through the bend route when the spindle rotates in accordance with the twisting deformation of the first energy absorbing member while the lock member is locked during the emergency, thereby undergoing local plastic deformation so as to absorb the impact energy, and wherein a deformation portion deforms when the spindle rotates while the lock member is locked during the emergency, the deformation portion being provided between a portion of the spindle and the returnly bent portion of the second energy absorbing member.

2. The seatbelt device according to claim 1, wherein the deformation portion is formed from one of rubber, elastomer resin, and foam metal.

3. The seatbelt device according to claim 1, wherein the deformation portion is a thin crush rib formed on part of the spindle so as to contact the returnly bent portion of the second energy absorbing member and be crushed when the spindle rotates during the emergency.

4. The seatbelt device according to claim 1, wherein the deformation portion includes an aperture provided in a contact portion of the spindle located adjacent to the returnly bent portion of the second energy absorbing member so as to contact the returnly bent portion during the emergency, and to reduce rigidity of the contact portion and enable deformation of the contact portion of the spindle during the emergency.

5. The seatbelt device according to claim 1, wherein the deformation portion is a pipe member disposed between the spindle and the returnly bent portion of the second energy absorbing member.

6. The seatbelt device according to claim 1, wherein the second energy absorbing member is constituted by a pair of second energy absorbing members disposed in positions differing from each other by a phase of 180° about a center of the spindle.

7. The seatbelt device of claim 1, wherein each of the bend routes provided on the lock member are circumferentially spaced from one another about the periphery of the lock member.

8. The seatbelt device of claim 1, wherein the deformation portion is part of the spindle.

9. The seatbelt device of claim 1, wherein the deformation portion contacts the returnly bent portion.

10. The seatbelt device of claim 1, wherein the deformation portion contacts the returnly bent portion and the spindle.

* * * * *

UNITED STATES PATENT AND TRADEMARK OFFICE
CERTIFICATE OF CORRECTION

PATENT NO. : 8,348,307 B2
APPLICATION NO. : 13/140299
DATED : January 8, 2013
INVENTOR(S) : Kazuhiro Moro It is certified that error appears in the above-identified patent and that said Letters Patent is hereby corrected as shown below:

In the Claims

Claim 1, column 14, line 37, please change "refractor" to --retractor--.

Signed and Sealed this
Eleventh Day of June, 2013

Teresa Stanek Rea
*Acting Director of the United States Patent and Trademark Office*